United States Patent
Kiuchi et al.

(10) Patent No.: US 7,498,757 B2
(45) Date of Patent: Mar. 3, 2009

(54) CONTROL DEVICE FOR A HYBRID ELECTRIC VEHICLE

(75) Inventors: Tatsuo Kiuchi, Kanagawa (JP); Takashi Kobayashi, Kanagawa (JP)

(73) Assignee: Mitsubishi Fuso Truck and Bus Corporation, Kanagawa (JP)

( * ) Notice: Subject to any disclaimer, the term of this patent is extended or adjusted under 35 U.S.C. 154(b) by 128 days.

(21) Appl. No.: 11/714,190

(22) Filed: Mar. 6, 2007

(65) Prior Publication Data

US 2007/0205735 A1   Sep. 6, 2007

(30) Foreign Application Priority Data

Mar. 6, 2006   (JP) .............................. 2006-059387

(51) Int. Cl.
*H02P 7/00* (2006.01)

(52) U.S. Cl. ..................... 318/432; 318/63; 180/65.1; 180/176; 123/339.16

(58) Field of Classification Search ................. 318/63, 318/139, 430, 432, 434; 477/15; 475/5; 180/176, 65.1; 123/16, 339; 701/70, 91, 701/93
See application file for complete search history.

(56) References Cited

U.S. PATENT DOCUMENTS

| | | | |
|---|---|---|---|
| 5,720,690 | A | 2/1998 | Hara et al. |
| 6,155,230 | A * | 12/2000 | Iwano et al. ............ 123/339.16 |
| 6,513,610 | B2 * | 2/2003 | Ochiai et al. ................. 180/176 |
| 6,543,565 | B1 | 4/2003 | Phillips et al. |
| 7,200,480 | B2 * | 4/2007 | Kustosch ...................... 701/93 |
| 7,216,943 | B2 * | 5/2007 | Nishikawa et al. .......... 303/152 |
| 2002/0017413 | A1 * | 2/2002 | Ochiai et al. ................. 180/178 |
| 2005/0000479 | A1 * | 1/2005 | Niki et al. ................. 123/90.15 |
| 2005/0055151 | A1 * | 3/2005 | Kustosch ...................... 701/93 |
| 2005/0099146 | A1 * | 5/2005 | Nishikawa et al. ............ 318/63 |
| 2005/0187694 | A1 * | 8/2005 | Shiiba et al. ................... 701/70 |
| 2007/0205036 | A1 * | 9/2007 | Ogata et al. ................. 180/337 |
| 2007/0216312 | A1 * | 9/2007 | Ogata et al. ................. 315/131 |
| 2007/0219045 | A1 * | 9/2007 | Ogata et al. ..................... 477/3 |
| 2007/0239340 | A1 * | 10/2007 | Miura ........................... 701/70 |
| 2008/0070745 | A1 * | 3/2008 | Ogata ........................... 477/15 |
| 2008/0207373 | A1 * | 8/2008 | Conlon ........................... 475/5 |

FOREIGN PATENT DOCUMENTS

| | | |
|---|---|---|
| DE | 196 23 847 A1 | 12/1996 |
| DE | 101 55 129 A1 | 10/2002 |
| JP | 05-176405 | 7/1993 |

\* cited by examiner

*Primary Examiner*—Paul Ip
(74) *Attorney, Agent, or Firm*—Jacobson Holman PLLC (57) ABSTRACT

A hybrid electric vehicle is capable of transmitting driving forces of an engine and an electric motor to driving wheels through an automatic transmission and of releasing mechanical connection between the engine and the transmission by a clutch. A torque control unit switches between deceleration implemented only by the motor and deceleration by the engine and the motor by controlling the clutch based upon magnitude relation between a required deceleration torque and an upper limit deceleration torque generable by the motor. The required torque and the upper limit deceleration torques become equal to each other when the revolution speed of the motor is predetermined revolution speed. The predetermined revolution speed for the required deceleration torque corresponding to a forward gear related to downshift of the transmission differs from revolution speed that falls in the range of revolution speed fluctuation of the motor at the time of the downshift.

6 Claims, 6 Drawing Sheets

CONTROL DEVICE FOR A HYBRID ELECTRIC VEHICLE

BACKGROUND OF THE INVENTION

1. Field of the Invention

The present invention relates to a control device for a hybrid electric vehicle, and more specifically, to a control device for a hybrid electric vehicle capable of transmitting a driving force of an engine and that of an electric motor to driving wheels of a vehicle.

2. Description of the Related Art

A so-called parallel hybrid electric vehicle capable of transmitting the driving force of the engine and that of the electric motor to the driving wheels of a vehicle has conventionally been developed and in practical use.

As a parallel hybrid electric vehicle, a hybrid electric vehicle in which there is provided a clutch that mechanically connects/disconnects the engine and the automatic transmission, and the rotary shaft of the electric motor is coupled to between the output shaft of the clutch and the input shaft of the automatic transmission, is proposed, for example, in Unexamined Japanese Patent Publication No. 5-176405 (hereinafter, referred to as Patent Document 1).

In the hybrid electric vehicle as shown in Patent Document 1, the clutch is disengaged at the start of the vehicle, and the electric motor is operated as a motor by power supply from the battery. Therefore, the vehicle starts traveling by using only the driving force of the electric motor. During the traveling of the vehicle after startup, the clutch is engaged, and the driving force of the engine is transmitted to the driving wheels through the transmission.

At the time of deceleration of the vehicle, the electric motor is operated as a generator to create a regenerative braking force. Regenerative braking energy that is produced in this process is converted to electric power and charged to the battery.

When the accelerator pedal is released, and the hybrid electric vehicle in deceleration with the service brake system of the vehicle not operated, a deceleration torque is determined as a required deceleration torque, which can achieve virtually the same deceleration as the deceleration produced when a similar vehicle whose power source is only an engine is decelerated in a similar manner. The electric motor and the engine are controlled so that the required deceleration torque is obtained.

An upper limit deceleration torque is prescribed in the electric motor, which is a maximum value of a regenerative braking torque that can be generated depending upon the specifications of the electric motor. The electric motor is capable of generating the regenerative braking torque up to the upper limit deceleration torque.

Figure 6:
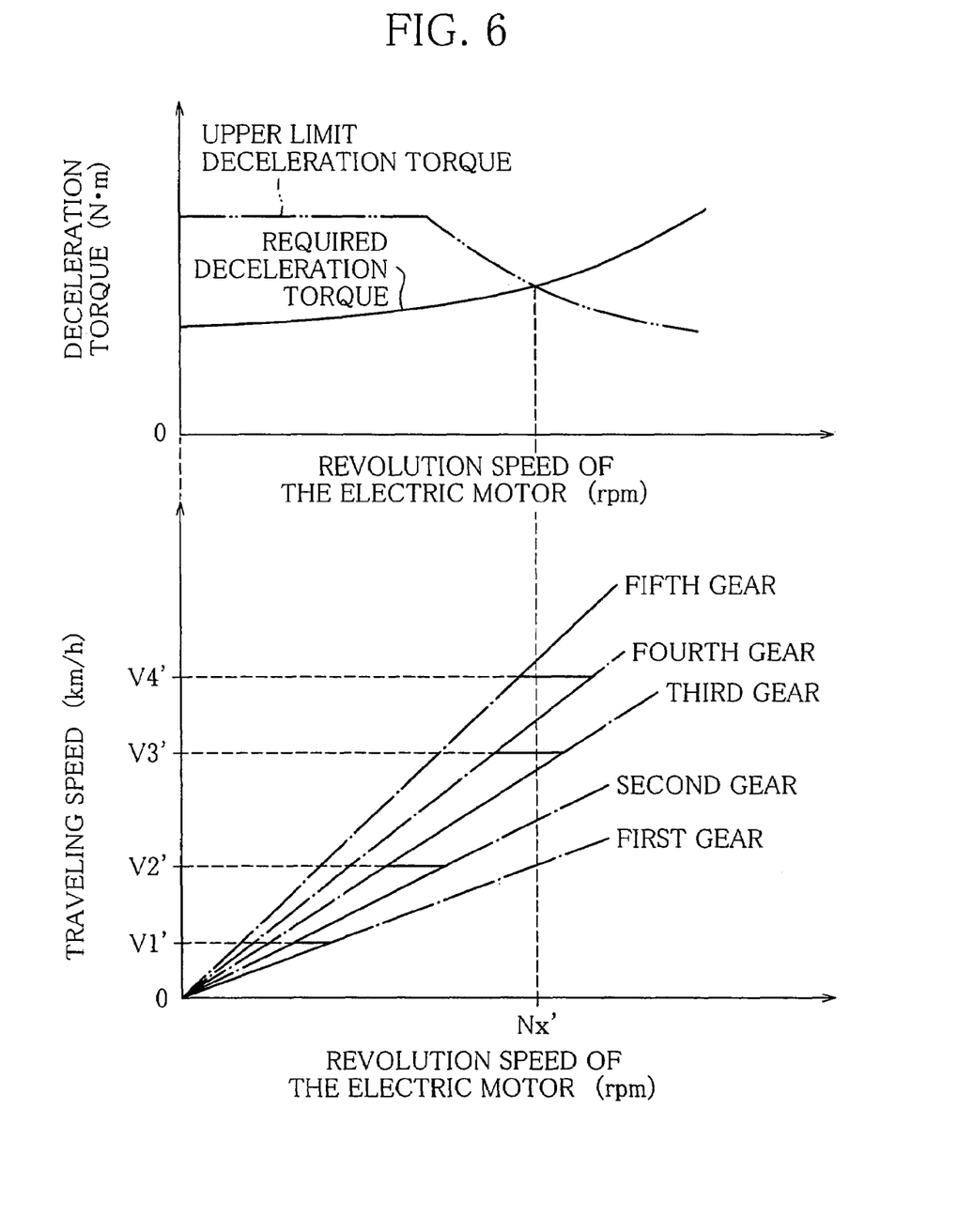
FIG. 6 is a graph showing relationship between an upper limit deceleration torque and a required deceleration torque in a conventional hybrid electric vehicle, and changes of revolution speed of an electric motor along with a reduction of traveling speed at the time of deceleration of the vehicle.

The required deceleration torque and the upper limit deceleration torque of the electric motor, which are used here, have relationship as shown in an upper graph of FIG. 6. That is to say, as the revolution speed of the electric motor is increased, the required deceleration torque becomes large. The upper limit deceleration torque is at a constant value in low revolution. In high revolution, the value of the upper limit deceleration torque becomes smaller as the revolution speed of the electric motor is increased. When the revolution speed of the electric motor is a revolution speed Nx', the required deceleration torque and the upper limit deceleration torque are equal to each other.

If the revolution speed of the electric motor is higher than the revolution speed Nx', the required deceleration torque cannot be obtained only from the regenerative braking torque generable by the electric motor. Therefore, the clutch is engaged, and the engine and the electric motor are controlled so that the required deceleration torque may be obtained by combining the deceleration torque of the engine with the regenerative braking torque of the electric motor.

If the revolution speed of the electric motor is equal to or lower than the revolution speed Nx', it is possible to obtain the regenerative braking torque equal to the required deceleration torque from the electric motor. Therefore, the clutch is disengaged, and the electric motor is controlled so that the required deceleration torque is generated only by the regenerative braking of the electric motor. This allows as much deceleration energy as possible to be converted to electric power and to be returned to the battery.

If an automatic transmission is used in the hybrid electric vehicle thus constructed, when the vehicle is in deceleration, the automatic transmission is gradually downshifted to lower gears along with a reduction of the traveling speed, that is, a reduction of the revolution speed of the electric motor.

The shifts of gears of the automatic transmission and corresponding changes of the revolution speed of the electric motor are shown by a solid line in a lower graph of FIG. 6. Straight chain lines in FIG. 6 indicate relationships between traveling speeds at different gears and the respective revolution speeds of the electric motor with respect to each gear. Hereinafter, these chain lines will be referred to as speed-change lines.

In a state where the downshift of the automatic transmission is not being carried out, as the traveling speed decreases, the revolution speed of the electric motor changes in the decreasing direction along the speed-change line corresponding to the present gear. When downshift is carried out in the deceleration according to a predetermined gear shift map for downshift, the revolution speed of the electric motor increases while moving from the speed-change line corresponding to the gear before the gear shift to the one corresponding to an adjacent lower gear, which is the selected gear after the gear shift.

For instance, if the automatic transmission has five forward gears, and the vehicle is brought into a deceleration running state by releasing the accelerator pedal with the fifth gear selected, the revolution speed of the electric motor changes in the decreasing direction along the speed-change line corresponding to the fifth gear as the traveling speed decreases. At this time, as shown by the solid line that is drawn along the speed-change line corresponding to the fifth gear in FIG. 6, the revolution speed of the electric motor passes through the revolution speed Nx' at which the required deceleration torque and the upper limit deceleration torque become equal to each other. Consequently, when the revolution speed of the electric motor passes through the revolution speed Nx', the clutch is switched from an engaged position to a disengaged position.

When the traveling speed decreases to V4', the automatic transmission is downshifted from the fifth to the fourth gear. Along with this downshift, the revolution speed of the electric motor increases while moving from the speed-change line of the fifth gear to that of the fourth gear as shown in FIG. 6. At this time, the revolution speed of the electric motor passes through the revolution speed Nx' again. When the revolution speed moves from a state being lower than the revolution speed Nx' to a state being higher than the revolution speed Nx', the clutch is switched from the disengaged position to the engaged position.

If the vehicle is continuously decelerated after the downshift to the fourth gear, the revolution speed of the electric motor changes in the decreasing direction along the speed-change line corresponding to the fourth gear as in the case where the gear is the fifth. Again, the revolution speed of the electric motor passes through the revolution speed Nx', so that the clutch is switched from the engaged position to the disengaged position as in the case of the fifth gear.

When the traveling speed further decreases to reach V3', the automatic transmission is downshifted from the fourth to the third gear. In response to this downshift, the revolution speed of the electric motor increases while moving from the speed-change line of the fourth gear to that of the third gear as shown in FIG. 6. At this time, the revolution speed of the electric motor passes through the revolution speed Nx' again, so that the clutch is switched from the disengaged position to the engaged position.

If the vehicle is continuously decelerated after the downshift to the third gear, the revolution speed of the electric motor changes in the decreasing direction along the speed-change line corresponding to the third gear. Again, the revolution speed of the electric motor passes through the revolution speed Nx', so that the clutch is switched from the engaged position to the disengaged position as in the cases of the fifth and fourth gears.

Thereafter, if the traveling speed reaches V2' in response to a further reduction of the traveling speed, the automatic transmission is downshifted from the third to the second gear. When the traveling speed reaches V1', the automatic transmission is downshifted from the second to the first gear. In response to the reduction of the traveling speed and the downshift of the automatic transmission, as in the foregoing cases, the revolution speed of the electric motor decreases although with moving from the speed-change line corresponding to the third gear to the speed-change line corresponding to the second gear and moving from the speed-change line corresponding to the second gear to the speed-change line corresponding to the first gear.

If the traveling speed decreases due to deceleration of the vehicle, the engagement/disengagement of the clutch are repeated over and over every time the gears of the automatic transmission are sequentially downshifted from the fifth gear. The repetition of the engagement/disengagement of the clutch causes the problem that the clutch is increasingly abraded away and is degraded in durability. There is another problem that drive feeling is deteriorated due to an increase in vibrations and noises caused by operations of the clutch.

The clutch engagement requires that engine revolution be adjusted to the revolution speed of the electric motor beforehand for the engagement to be smoothly performed. Since, as described above, the clutch is frequently engaged/disengaged at the time of deceleration, the engine revolution is also changed very often. Consequently, there arises a problem of degradation in fuel economy.

SUMMARY OF THE INVENTION

An aspect of the present invention is directed to a control device for a hybrid electric vehicle capable of transmitting a driving force of an engine and a driving force of an electric motor to driving wheels through an automatic transmission and capable of releasing mechanical connection between the engine and the automatic transmission by using a clutch, comprising revolution speed detection means for detecting revolution speed of the electric motor; shift control means that downshifts the automatic transmission according to a reduction of traveling speed of the electric vehicle at the time of deceleration of the electric vehicle; and torque control means that sets an upper limit deceleration torque that is a deceleration torque generable by the electric motor and a required deceleration torque that is a deceleration torque to be generated by the engine and the electric motor corresponding to a forward gear presently used in the automatic transmission according to revolution speed detected by the revolution speed detection means at the time of deceleration of the electric vehicle, wherein the torque control means disengages the clutch and controls the electric motor so as to generate the required deceleration torque when the upper limit deceleration torque is equal to or larger than the required deceleration torque, and on the other hand, engages the clutch and controls the engine and the electric motor so that a sum of a deceleration torque of the engine and a deceleration torque of the electric motor equals the required deceleration torque when the upper limit deceleration torque is smaller than the required deceleration torque, wherein the upper limit deceleration torque is set so as to be equal to the required deceleration torque when the revolution speed of the electric motor is predetermined revolution speed, to be larger than the required deceleration torque in a range where the revolution speed of the electric motor is lower than the predetermined revolution speed, and to be smaller than the required deceleration torque in a range where the revolution speed of the electric motor is higher than the predetermined revolution speed; and the predetermined revolution speed for the required deceleration torque corresponding to a forward gear related to downshift of the automatic transmission is different from revolution speed that falls in a range of revolution speed fluctuation of the electric motor at the time of downshift.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

A first embodiment of the present invention will be described below with reference to the attached drawings.

Figure 1:
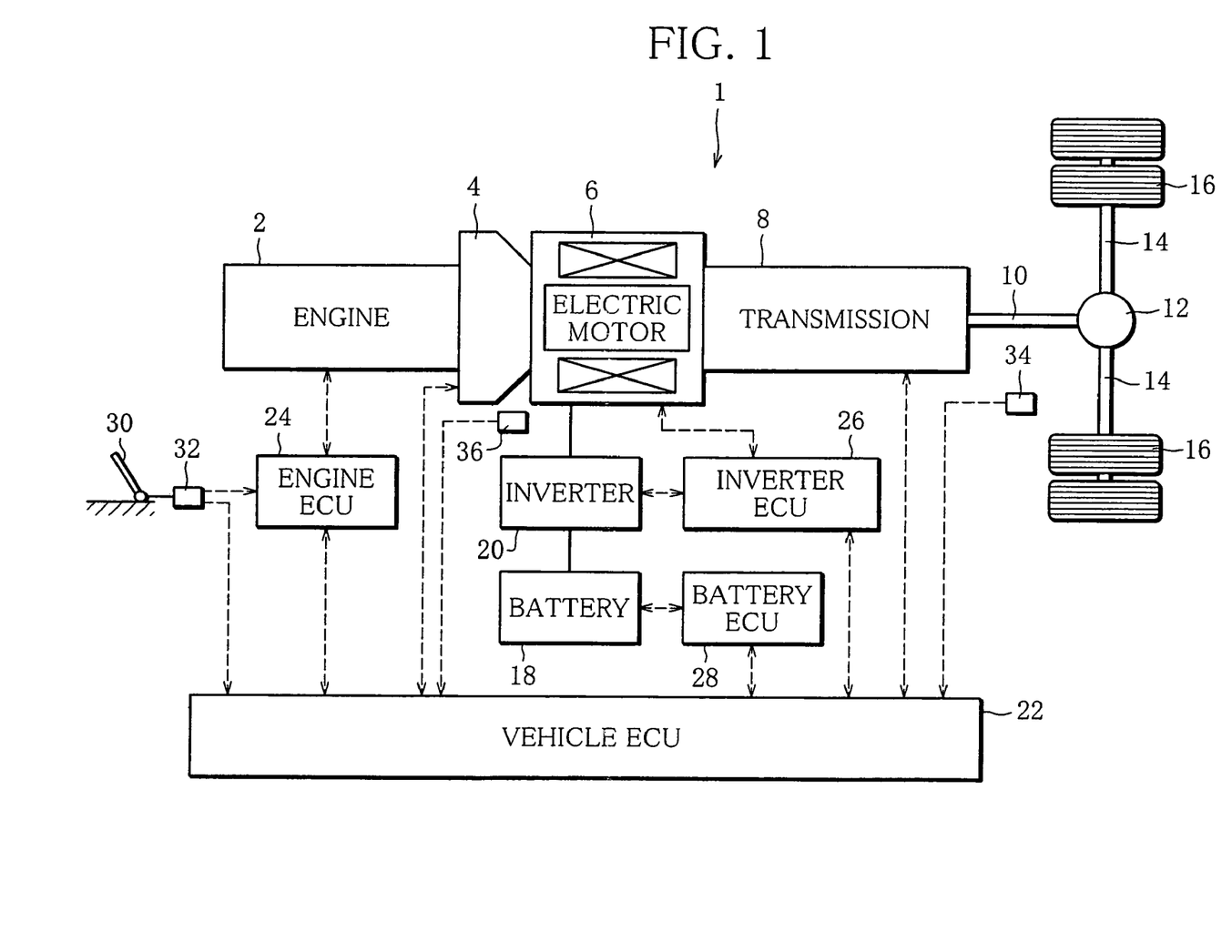
FIG. 1 is a configuration view showing a substantial part of a hybrid electric vehicle having a control device according to first to fourth embodiments of the present invention.

FIG. 1 is a configuration view showing a substantial part of a hybrid electric vehicle 1 to which the present invention is applied.

An input shaft of a clutch 4 is coupled to an output shaft of an engine 2, which is a diesel engine. An output shaft of the clutch 4 is coupled to an input shaft of an automatic transmission (hereinafter, referred to as transmission) 8 having five forward gears (hereinafter, simply referred to as gears) through a rotary shaft of a permanent-magnetic synchronous motor (hereinafter, referred to as electric motor) 6. An output shaft of the transmission 8 is connected to left and right driving wheels 16 through a propeller shaft 10, a differential gear unit 12 and a driving shafts 14.

When the clutch 4 is engaged, both the output shaft of the engine 2 and the rotary shaft of the electric motor 6 can be mechanically connected with the driving wheels 16. When the clutch 4 is disengaged, only the rotary shaft of the electric motor 6 can be mechanically connected with the driving wheels 16.

The electric motor 6 is operated as a motor when DC power stored in a battery 18 is supplied to the electric motor 6 after being converted into AC power by an inverter 20. A driving torque of the electric motor 6 is transmitted to the driving wheels 16 after being shifted to proper speed by the transmission 8. At the time of deceleration of the vehicle, the electric motor 6 is operated as a generator. Kinetic energy created by the revolution of the driving wheels 16 is transmitted to the electric motor 6 through the transmission 8 to be converted into AC power, thereby producing a deceleration torque based on a regenerative braking force. This AC power is converted into DC power by the inverter 20 and is then charged to the battery 18. In this manner, the kinetic energy created by the revolution of the driving wheels 16 is recovered as electric energy.

Meanwhile, when the clutch 4 is engaged, a driving torque of the engine 2 is transmitted to the transmission 8 through the rotary shaft of the electric motor 6. After being shifted to proper speed, the driving torque of the engine 2 is transmitted to the driving wheels 16. Accordingly, if the electric motor 6 is operated as a motor while the driving torque of the engine 2 is transmitted to the driving wheels 16, both the driving torque of the engine 2 and the driving torque of the electric motor 6 are transmitted to the driving wheels 16. In other words, a part of the driving torque to be transmitted to the driving wheels 16 for driving the vehicle is supplied from the engine 2, and at the same time, the rest of the driving torque is supplied from the electric motor 6.

If a storage rate (hereinafter, referred to as SOC) of the battery 18 lowers, and the battery 18 then needs to be charged, the electric motor 6 is operated as a generator. At the same time, the electric motor 6 is driven by using a part of the driving torque of the engine 2, to thereby carry out power generation. The AC power thus generated is converted into DC power by the inverter 20, and the battery 18 is charged with this DC power.

A vehicle ECU 22 implements engagement/disengagement control of the clutch 4 and gear shift control of the transmission 8 according to an operating state of the vehicle and of the engine 2 and information from an engine ECU 24, an inverter ECU 26, a battery ECU 28, etc. The vehicle ECU 22 also performs integrated control for properly operating the engine 2 and the electric motor 6 in accordance with conditions of the above-mentioned controls and various operation states, such as start, acceleration and deceleration of the vehicle. Therefore, the vehicle ECU 22 functions as torque control means and gear-shift control means of the present invention.

The hybrid electric vehicle 1 is equipped with an accelerator opening sensor 32 for detecting the depression amount of an accelerator pedal 30, a vehicle speed sensor 34 for detecting the traveling speed of the vehicle, and a revolution speed sensor (revolution speed detection means) 36 for detecting the revolution speed of the electric motor 6. When implementing the above-described controls, the vehicle ECU 22 calculates a total driving torque required for the traveling of the vehicle and a total deceleration torque to be generated by the engine 2 and the electric motor 6 in deceleration of the vehicle, based upon the detection results supplied from the accelerator opening sensor 32, the vehicle speed sensor 34 and the revolution speed sensor 36. The vehicle ECU 22 sets a torque to be generated by the engine 2 and a torque to be generated by the electric motor 6 on the basis of the total driving torque and the total deceleration torque.

The engine ECU 24 carries out various kinds of controls required for the operation of the engine 2 per se, including start/stop control and idle control of the engine 2, regeneration control of an exhaust emission purifying device, not shown, and the like. The engine ECU 24 controls a fuel injection amount, fuel injection timing, etc. of the engine 2 so that the engine 2 generates the torque required in the engine 2, which has been set by the vehicle ECU 22.

The inverter ECU 26 controls the inverter 20 according to the torque to be generated by the electric motor 6, which has been set by the vehicle ECU 22, and thereby controls the electric motor 6 to operate the electric motor 6 as a motor or generator.

The battery ECU 28 detects the temperature and voltage of the battery 18, a current flowing between the inverter 20 and the battery 18, etc. The battery ECU 28 obtains the SOC of the battery 18 from these detection results, and transmits the obtained SOC to the vehicle ECU 22 together with the detection results.

The outline of controls performed mainly by the vehicle ECU 22, in the hybrid electric vehicle 1 arranged as described above, to run the vehicle is as follows:

First, it is assumed that the vehicle is at rest, and that the engine 2 is not operated. When a driver operates a starter switch, not shown, to start the engine 2, with a shift change lever, not shown, in neutral position, the vehicle ECU 22 confirms that the transmission 8 is in neutral state so that the electric motor 6 and the driving wheels 16 are mechanically disconnected, and that the clutch 4 is engaged. The vehicle ECU 22 subsequently indicates to the inverter ECU 26 a driving torque of the electric motor 6, which is required for starting the engine 2, and commands the engine ECU 24 to operate the engine 2.

Based upon the indication from the vehicle ECU 22, the inverter ECU 26 operates the electric motor 6 as a motor and makes the electric motor 6 generate the driving torque, and thereby crank the engine 2. At this moment, the engine ECU 24 starts fuel supply to the engine 2, resulting in startup of the engine 2. After the startup of the engine 2 is completed, the engine 2 performs an idle operation.

After the engine 2 is started in this manner, when the vehicle is at rest, the engine 2 is in the idle operation state. When the driver puts the shift change lever in drive position or the like, the clutch 4 is disengaged. Furthermore, if the driver steps on the accelerator pedal 30, the vehicle ECU 22 sets a driving torque of the electric motor 6, which is required to start traveling the vehicle according to a depression amount of the accelerator pedal 30 detected by the accelerator opening sensor 32.

The inverter ECU 26 controls the inverter 20 according to the torque set by the vehicle ECU 22 so that DC power of the battery 18 is converted into AC power by the inverter 20 and supplied to the electric motor 6. By being supplied with the AC power, the electric motor 6 is operated as a motor to generate a driving torque. The driving torque of the electric motor 6 is transmitted to the driving wheels 16 through the transmission 8, and the vehicle thereby starts traveling.

After the start, the vehicle accelerates so that the revolution speed of the electric motor 6 increases to the vicinity of the idle speed of the engine 2, the vehicle ECU 22 engages the clutch 4. At this point of time, the vehicle ECU 22 obtains a total driving torque required for further acceleration of the vehicle and the subsequent traveling, based upon the depression amount of the accelerator pedal 30 detected by the accelerator opening sensor 32 and the traveling speed of the vehicle detected by the vehicle speed sensor 34. The vehicle ECU 22 properly divides the total driving torque between the engine 2 and the electric motor 6 depending on the operating state of the vehicle, and sets a torque to be generated by the engine 2 and a driving torque to be generated by the electric motor 6. In addition, the vehicle ECU 22 indicates to the engine ECU 24 the torque to be generated by the engine 2, and also indicates to the inverter ECU 26 the driving torque to be generated by the electric motor 6.

Upon receipt of the indications about the driving torques determined by the vehicle ECU 22, the engine ECU 24 and the inverter ECU 26 control the engine 2 and the electric motor 6, respectively. As a result, the driving torque generated by the engine 2 and the driving torque generated by the electric motor 6 are transmitted to the driving wheels 16 through the transmission 8 so that the vehicle travels. In this process, the vehicle ECU 22 properly implements a gear shift control of the transmission 8 according to the operating state of the vehicle, including the depression amount of the accelerator pedal 30 detected by the accelerator opening sensor 32 and the traveling speed detected by the vehicle speed sensor 34. The vehicle ECU 22 also commands the engine ECU 24 and the inverter ECU 26 to properly control the torque of the engine 2 and the torque of the electric motor 6 in response to the gear shift.

Next, how that deceleration of the vehicle is performed will be described.

If the accelerator pedal 30 is released, the vehicle ECU 22 obtains a total deceleration torque to be generated by the engine 2 and the electric motor 6 during the deceleration of the vehicle as a required deceleration torque according to the revolution speed of the electric motor 6 detected by the revolution speed sensor 36. The vehicle ECU 22 properly divides the required deceleration torque between the engine 2 and the electric motor 6, and indicates to the engine ECU 24 a deceleration torque to be generated by engine 2 and to the inverter ECU 26 a deceleration torque to be generated by the electric motor 6. The required deceleration torque is used in common regardless of the gears of the transmission 8. The required deceleration torque is previously set correspondingly to the revolution speed of the electric motor 6 as the required deceleration torque required in obtaining proper deceleration for the vehicle. The required deceleration torque is previously stored in the vehicle ECU 22.

Upon receipt of the indication from the vehicle ECU 22, the engine ECU 24 brings the engine 2 into a deceleration state, and makes the engine 2 generate the deceleration torque by engine braking. At the same time, the inverter ECU 26 controls the inverter 20 to operate the electric motor 6 as a generator, and makes the electric motor 6 generate the regenerative braking torque.

Due to the generator operation of the electric motor 6, the kinetic energy created by the revolution of the driving wheels 16 is transmitted to the electric motor 6 through the transmission 8 to be converted into AC power. As a result, the regenerative braking torque that has been indicated by the vehicle ECU 22 is generated by the electric motor 6. The AC power obtained by the electric motor 6 is converted into DC power by the inverter 20 to be charged to the battery 18. In this manner, the kinetic energy created by the revolution of the driving wheels 16 is recovered as electric energy.

At this time, an upper limit deceleration torque that is the maximum value of the regenerative braking torque, which can be generated by the electric motor 6 depending on the specifications of the electric motor 6, is set according to the revolution speed of the electric motor 6. Relationship between the required deceleration torque and the upper limit deceleration torque is as shown in an upper graph of FIG. 2.

Figure 2:
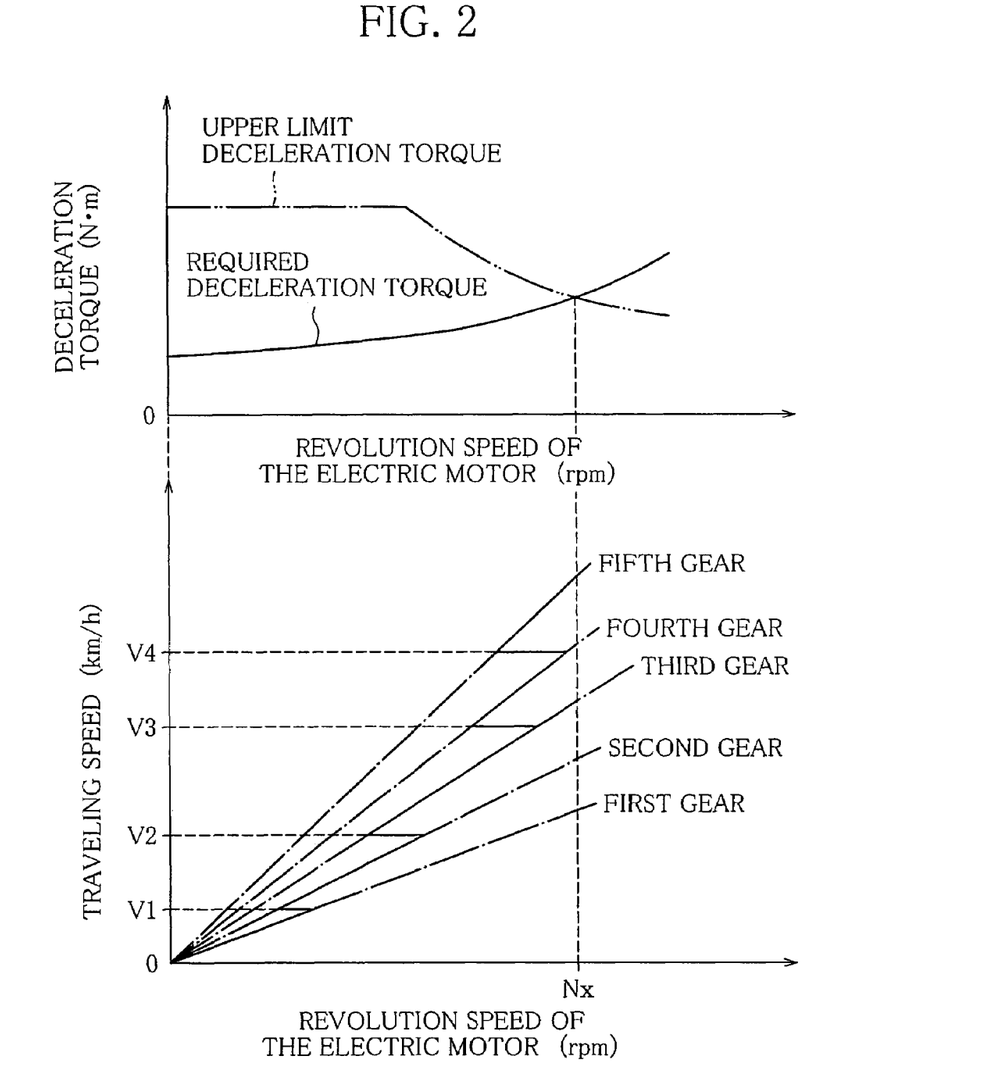
FIG. 2 is a graph showing relationship between an upper limit deceleration torque and a required deceleration torque, and changes of revolution speed of an electric motor along with a reduction of traveling speed at the time of deceleration of a vehicle, in the first embodiment of the present invention.

As shown in FIG. 2, the upper limit deceleration torque is a constant value in a range where the revolution speed of the electric motor 6 is relatively low. In a range where the revolution speed is relatively high, as the revolution speed of the electric motor 6 increases, the value of the upper limit deceleration torque becomes small. In contrast, the value of the required deceleration torque becomes large as the revolution speed of the electric motor 6 increases. The required deceleration torque and the upper limit deceleration torque become equal to each other when the revolution speed of the electric motor 6 is a revolution speed Nx (predetermined revolution speed).

For that reason, when the revolution speed of the electric motor 6 is higher than the revolution speed Nx, the required deceleration torque cannot be obtained only by the regenerative braking torque generable by the electric motor 6. Therefore, the vehicle ECU 22 engages the clutch 4, and indicates to the engine ECU 24 a deceleration torque to be generated by the engine 2 and indicates to the inverter ECU 26 a regenerative braking torque to be generated by the electric motor 6 so that the required deceleration torque may be produced by combining the deceleration torque of the engine 2 with the regenerative braking torque of the electric motor 6.

If the revolution speed of the electric motor 6 is equal to or lower than the revolution speed Nx, the regenerative braking torque equal to the required deceleration torque can be obtained from the electric motor 6. Consequently, the vehicle ECU 22 disengages the clutch 4, and makes the electric motor 6 generate the required deceleration torque simply by the regenerative braking of the electric motor 6. By controlling the clutch 4 and the electric motor 6 as described, the vehicle ECU 22 converts the deceleration energy into electric power as much as possible and returns the electric power to the battery 18.

While the vehicle is being decelerated in this way, the vehicle ECU 22 downshifts the transmission 8 in turn, correspondingly to a reduction of the traveling speed detected by the traveling speed sensor 34 according to the predetermined gear shift map for shift down.

If the revolution speed of the engine 2 and the revolution speed of the electric motor 6 are significantly different from each other when the clutch 4 is engaged, there generates a great torque shock. Therefore, when engaging the clutch 4, the vehicle ECU 22 previously commands the engine ECU 24 to raise the revolution speed of the engine 2 from the idle speed so that the revolution speed of the engine 2 substantially corresponds to the revolution speed of the electric motor

6. In accordance with this command, the engine ECU 24 raises the revolution speed of the engine 2 by increasing a fuel supply amount of the engine 2, to thereby adjust the revolution speed of the engine 2 to correspond to the revolution speed of the electric motor 6.

Relationships between the traveling speed and the revolution speed of the electric motor 6 corresponding to each gear of the transmission 8 are shown by straight chain lines in a lower graph of FIG. 2. Hereinafter, these straight lines are referred to as speed-change lines. The gear shift map for downshift is configured such that the transmission 8 are downshifted from the fifth to the fourth gear when the traveling speed detected by the traveling speed sensor 34 decreases to V4, from the fourth to the third gear when the traveling speed decreases to V3, from the third to the second gear when the traveling speed decreases to V2, and from the second to the first gear when the traveling speed decreases to V1.

The gear shift map used in the present embodiment is the same as one used in a conventional hybrid electric vehicle. In other words, the speed-change lines of the gears and the traveling speeds from V1 to V4 at which the downshift during deceleration of the vehicle is carried out, which are shown in FIG. 2, are the same as those of a conventional hybrid electric vehicle shown in FIG. 6.

The lower graph of FIG. 2 shows, by a solid line, changes of the revolution speed of the electric motor 6, which are caused by a reduction of the traveling speed and the downshift of the transmission 8 in the case that the vehicle is decelerated by releasing the accelerator pedal 30 with the fifth gear of the transmission 8 selected.

That is to say, when the vehicle is decelerated by releasing the accelerator pedal 30 during the traveling with the fifth gear, the revolution speed of the electric motor 6 changes in a decreasing direction along the speed-change line corresponding to the fifth gear as the traveling speed decreases. When the traveling speed decreases to reach V4, the vehicle ECU 22 downshifts the transmission 8 from the fifth to the fourth gear. Along with this downshift, the revolution speed of the electric motor 6 increases while moving from the speed-change line of the fifth gear to that of the fourth gear as shown by the solid line in FIG. 2.

If the vehicle is continuously decelerated after the downshift to the fourth gear, the revolution speed of the electric motor 6 changes in the decreasing direction along the speed-change line corresponding to the fourth gear. When the traveling speed further decreases to reach V3, the vehicle ECU 22 downshifts the transmission 8 from the fourth to the third gear. Along with this downshift, the revolution speed of the electric motor 6 increases while moving from the speed-change line of the fourth gear to that of the third gear as shown by the solid line in FIG. 2.

If the vehicle is continuously decelerated after the downshift to the third gear, the revolution speed of the electric motor 6 changes in the decreasing direction along the speed-change line corresponding to the third gear. When the traveling speed further decreases to reach V2, the vehicle ECU 22 downshifts the transmission 8 from the third to the second gear. Along with this downshift, the revolution speed of the electric motor 6 increases while moving from the speed-change line of the third gear to that of the second gear as shown by the solid line in FIG. 2.

If the vehicle is continuously decelerated after the downshift to the second gear, the revolution speed of the electric motor 6 changes in the decreasing direction along the speed-change line corresponding to the second gear. When the traveling speed further decreases to reach V1, the vehicle ECU 22 downshifts the transmission 8 from the second to the first gear. Along with this downshift, the revolution speed of the electric motor 6 increases while moving from the speed-change line of the second gear to that of the first gear as shown by the solid line in FIG. 2.

In the present embodiment, when the vehicle is decelerated in the foregoing fashion, the required deceleration torque is set to a relatively small value within a proper range from a practical viewpoint. And thereby, a point at which the required deceleration torque intersects the upper limit deceleration torque in the upper graph of FIG. 2 is shifted to a high rotation side of the electric motor 6. By so doing, the fluctuation of the revolution speed of the electric motor 6 when downshift is performed at each gear is generated in a range lower than the revolution speed Nx at which the required deceleration torque and the upper limit deceleration torque are equal to each other as shown in FIG. 2.

Consequently, the revolution speed of the electric motor 6 changes through the revolution speed Nx at the time of deceleration of the vehicle only once and only when the revolution speed changes along the speed-change line of the fifth gear with the reduction of the traveling speed. Since the operation frequency of the clutch 4 at the time of deceleration of the vehicle is thus reduced, it is possible to suppress a decrease in durability of the clutch 4 which is caused by abrasion of the clutch 4, and to prevent a deterioration in drive feeling which is brought about by an increase of vibrations and noises resulting from frequent operations of the clutch 4. It is also possible to improve the fuel economy by decreasing the frequency of adjustment of the engine revolution at the engagement of the clutch 4.

It is not necessary to alter the gear shift map used for the downshift of the transmission 8 in the present embodiment in consideration of the relationship between the revolution speed Nx and the fluctuation of the revolution speed of the electric motor 6 which is induced by the downshift. This increases latitude in setting gear-shift properties with respect to the transmission 8.

In the present embodiment, only when the fifth gear is in use at the time of deceleration of the vehicle, the revolution speed of the electric motor 6 changes through the revolution speed Nx. However, if the required deceleration torque or a gear ratio of the transmission 8 is set so that the revolution speed of the electric motor 6 along the speed-change line of the fifth gear is always lower than the revolution speed Nx in the range of actual traveling speed, the revolution speed of the electric motor 6 does not change through the revolution speed Nx along with the reduction of the traveling speed at the time of deceleration of the vehicle. This makes it possible to obtain the above-mentioned effects in more dramatic way.

In the first embodiment, the revolution speed Nx at which the required deceleration torque and the upper limit deceleration torque become equal to each other is adjusted to be different from the revolution speed that falls in the range of revolution speed fluctuation of the electric motor 6 at the time of downshift by setting the required deceleration torque to a relatively small value. However, the control device for a hybrid electric vehicle according to the present invention is not limited to one that carries out the above-mentioned control.

A control device for a hybrid electric vehicle according to a second embodiment of the present invention will be described below.

A configuration of a substantial part of a hybrid electric vehicle of the second embodiment is the same as that of the first embodiment as illustrated in FIG. 1. The second embodiment is virtually identical to the first in terms of the control that is implemented mainly by the vehicle ECU 22 in each traveling state of the vehicle except for the time of deceleration. Therefore, the control that is performed at the time of deceleration in the second embodiment will be described below.

Figure 3:
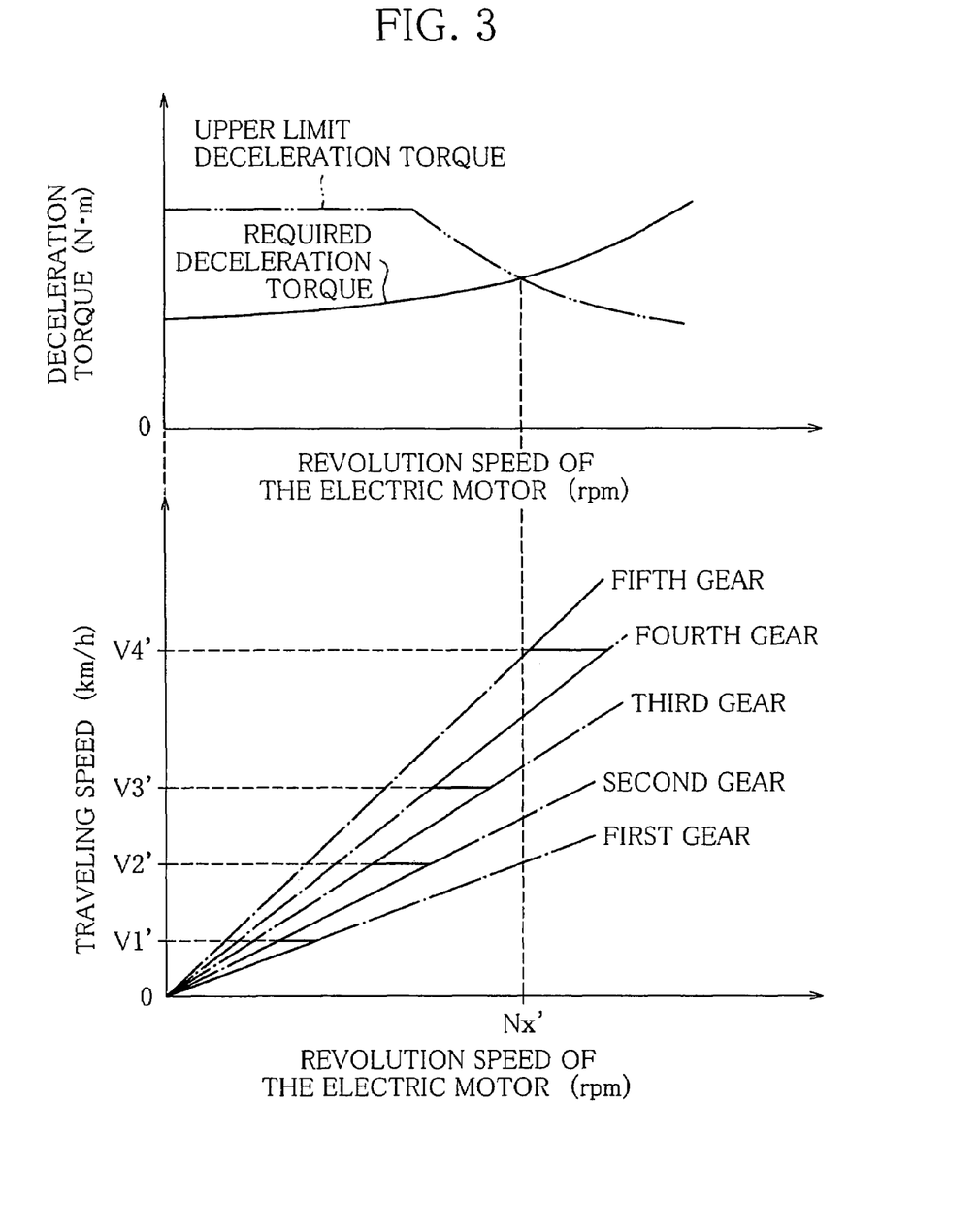
FIG. 3 is a graph showing relationship between the upper limit deceleration torque and the required deceleration torque, and changes of the revolution speed of the electric motor along with the reduction of the traveling speed at the time of deceleration of the vehicle, in the second embodiment of the present invention.

In the second embodiment, too, when the accelerator pedal 30 is released, the vehicle ECU 22 obtains a total deceleration torque to be generated by the engine 2 and the electric motor 6 to obtain proper deceleration for the vehicle in deceleration as a required deceleration torque according to the revolution speed of the electric motor 6 detected by the revolution speed sensor 36. The vehicle ECU 22 properly divides the required deceleration torque between the engine 2 and the electric motor 6, and indicates to the engine ECU 24 a deceleration torque to be generated by the engine 2 and to the inverter ECU 26 a deceleration torque to be generated by the electric motor 6. The required deceleration torque is used in common regardless of the gears of the transmission 8 as in the first embodiment.

Upon receipt of the indication from the vehicle ECU 22, the engine ECU 24 brings the engine 2 into a deceleration state and makes the engine 2 generate the deceleration torque by engine braking. The inverter ECU 26 controls the inverter 20 to operate the electric motor 6 as a generator and makes the electric motor 6 generate the regenerative braking torque.

At this time, an upper limit deceleration torque that is a maximum value of the regenerative braking torque which can be generated by the electric motor 6 depending on the specifications of the electric motor 6, is set according to the revolution speed of the electric motor 6. The relationship between the required deceleration torque and the upper limit deceleration torque is as shown in an upper graph of FIG. 3.

The upper limit deceleration torque shown by a two-dot chain line in FIG. 3 is the same as the one used in the first embodiment. Unlike the first embodiment, however, the required deceleration torque is not set to a relatively small value. Instead, the required deceleration torque is set strictly to such a value that the deceleration of the vehicle may be properly obtained according to the revolution speed of the electric motor 6. As shown in FIG. 3, when the revolution speed of the electric motor 6 is the revolution speed Nx' (predetermined revolution speed), the required deceleration torque and the upper limit deceleration torque become equal to each other. Accordingly, the revolution speed Nx' is lower than the revolution speed Nx of the first embodiment.

In the second embodiment, the relationship between the required deceleration torque and the upper limit deceleration torque which is shown in the upper graph of FIG. 3 is the same as the relationship between the upper limit deceleration torque and the required deceleration torque in a control device for the conventional hybrid electric vehicle shown in the upper graph of FIG. 6. For this reason, the revolution speed Nx' at which the required deceleration torque and the upper limit deceleration torque become equal to each other is the same as the revolution speed Nx' in the conventional hybrid electric vehicle as well.

As in the first embodiment, if the revolution speed of the electric motor 6 is higher than the revolution speed Nx', the vehicle ECU 22 engages the clutch 4. Furthermore, the vehicle ECU 22 indicates to the engine ECU 24 the deceleration torque to be generated by the engine 2 and indicates to the inverter ECU 26 the regenerative braking torque to be generated by the electric motor 6 so that the required deceleration torque may be produced by combining the deceleration torque of the engine 2 with the regenerative braking torque of the electric motor 6.

If the revolution speed of the electric motor 6 is equal to or lower than the revolution speed Nx', the vehicle ECU 22 disengages the clutch 4 and makes the electric motor 6 generate the required deceleration torque only by the regenerative braking of the electric motor 6. By so doing, the vehicle ECU 22 converts the deceleration energy into electric power as much as possible and returns the electric power to the battery 18.

When the vehicle is decelerated, the vehicle ECU 22 downshifts the transmission 8 in turn correspondingly to the reduction of the traveling speed according to the predetermined gear shift map for shift down.

When engaging the clutch 4, the vehicle ECU 22 raises the revolution speed of the engine 2 by increasing the fuel supply amount of the engine 2 to avoid a torque shock, to thereby adjust the revolution speed of the engine 2 to correspond to the revolution speed of the electric motor 6, as in the first embodiment.

The relationships between the traveling speed and the revolution speed of the electric motor 6 corresponding to each gear of the transmission 8 are shown in a lower graph of FIG. 3. The gear shift map for downshift is configured such that the transmission 8 is downshifted from the fifth to the fourth gear when the traveling speed detected by the traveling speed sensor 34 decreases to V4', from the fourth to the third gear when the traveling speed decreases to V3', from the third to the second gear when the traveling speed decreases to V2', and from the second to the first gear when the traveling speed decreases to V1'. In this way, the gear shift map differs from the one mentioned in the first embodiment.

The lower graph of FIG. 3 shows, by a solid line, changes of the revolution speed of the electric motor 6, which are caused by the reduction of the traveling speed and the downshift of the transmission 8 in the case where the accelerator pedal 30 is released and the vehicle is brought into deceleration with the fifth gear of the transmission 8 selected.

The change of the revolution speed of the electric motor 6 along each speed-change line, which is caused by the reduction of the traveling speed, and the change of the revolution speed of the electric motor 6 between two of the speed-change lines at the time of downshift are generated in the same manner as in the first embodiment. However, since the gear shift map for downshift is different from that of the first embodiment, the revolution speed fluctuation of the electric motor 6 which accompanies the downshift is caused when the traveling speed decreases to V4', V3', V2' and V1' respectively, as shown by the solid line in the lower graph of FIG. 3.

In the second embodiment, the gear shift map for downshift is set so that the revolution speed Nx' at which the required deceleration torque and the upper limit deceleration torque become equal to each other is not included in any of the ranges of revolution speed fluctuation of the electric motor 6 when downshift is carried out between gears. By thus setting the gear shift map for downshift, as shown in FIG. 3, the revolution speed of the electric motor 6 changes without passing through the revolution speed Nx' whenever the downshift is carried out.

As a result, the revolution speed of the electric motor 6 changes through the revolution speed Nx' at the time of deceleration of the vehicle only once and only when the revolution speed changes along the speed-change line of the fourth gear with the reduction of the traveling speed. This reduces the operation frequency of the clutch 4 at the time of deceleration of the vehicle. It is then possible to suppress a decrease in durability of the clutch 4 which is caused by abrasion of the clutch 4, and to prevent a deterioration in drive feeling which is brought about by an increase of vibrations and noises resulting from frequent operations of the clutch 4. It is also possible to improve the fuel economy by decreasing the frequency of adjustment of the engine revolution at the engagement of the clutch 4.

It is not necessary to set the required deceleration torque used in the second embodiment to a relatively low value in consideration of the relationship between the revolution speed Nx' and the revolution speed fluctuation of the electric motor 6 which is generated by downshift. Therefore, the latitude in setting the required deceleration torque is increased.

According to the second embodiment, only when the fourth gear is in use at the time of deceleration of the vehicle, the revolution speed of the electric motor 6 changes through the revolution speed Nx' as the traveling speed decreases. The same effect can be obtained if the gear shift map is arranged so that the revolution speed of the electric motor 6 changes through the revolution speed Nx' only once and only when moving along the speed-change line of a gear other than the fourth gear.

In the first and second embodiments, the required deceleration torque at the time of deceleration of the vehicle is common to all the gears of the transmission 8. In the first embodiment, the required deceleration torque is set to a relatively small value, while in the second embodiment, the gear shift map of the transmission 8 is set so that the revolution speed Nx' is not included in the range of revolution speed fluctuation of the electric motor 6 at the time of downshift. Instead, it is also possible to set the required deceleration torque individually with respect to each gear of the transmission 8 so that the revolution speed at which each required deceleration torque and the upper limit deceleration torque become equal to each other differs from the revolution speed that falls in the range of revolution speed fluctuation of the electric motor 6 at the time of downshift.

A control device for a hybrid electric vehicle in which the required deceleration torque is set individually with respect to each gear will be described below as third and fourth embodiments of the present invention.

A configuration of a substantial part of a hybrid electric vehicle according to the third embodiment is the same as that of the first as shown in FIG. 1. The third embodiment is virtually identical to the first in terms of the control that is carried out mainly by the vehicle ECU 22 in each traveling state of the vehicle except for the time of deceleration. Therefore, the control implemented at the time of deceleration of the vehicle will be described below.

Figure 4:
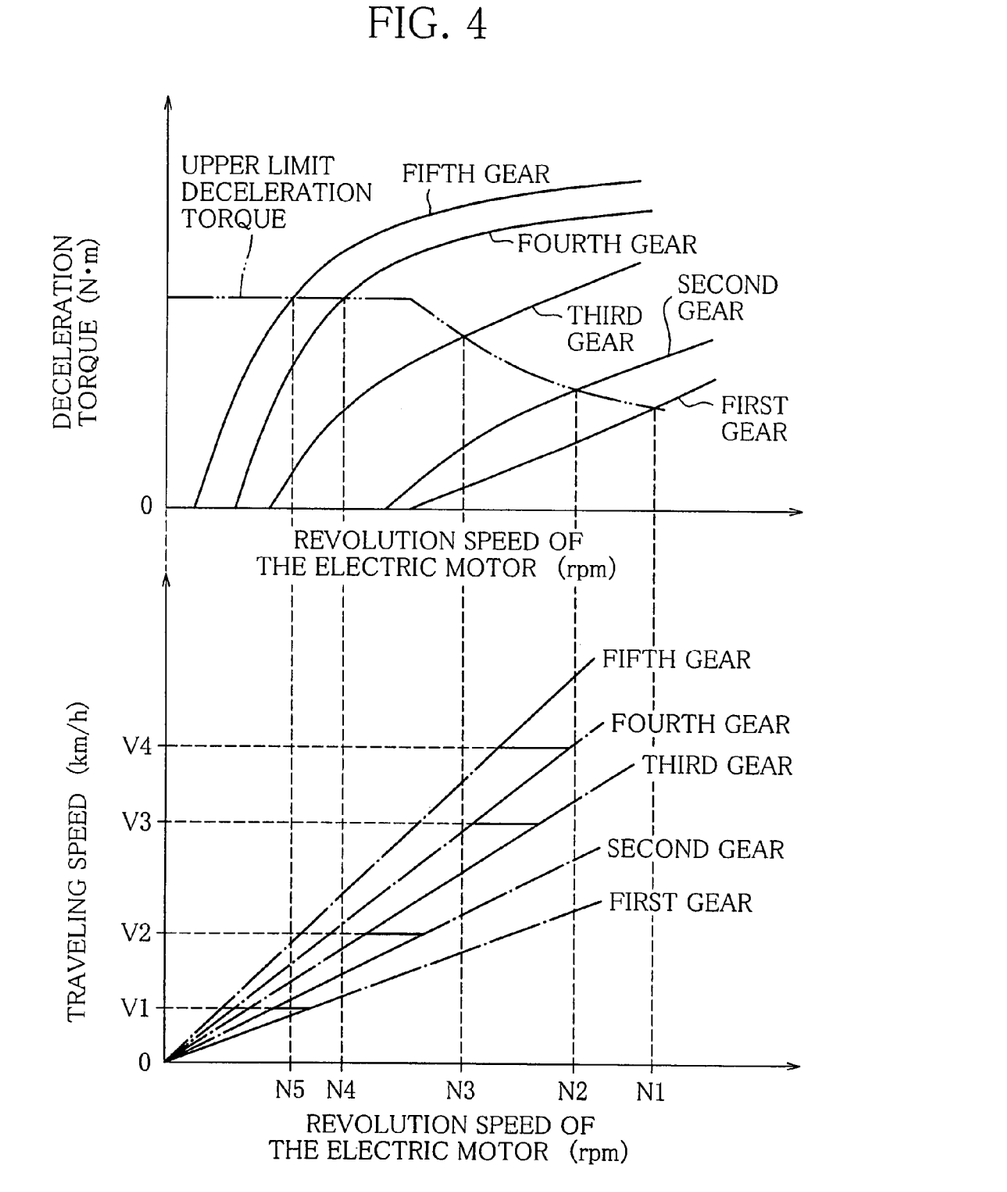
FIG. 4 is a graph showing relationship between the upper limit deceleration torque and the required deceleration torque, and changes of the revolution speed of the electric motor along with the reduction of the traveling speed at the time of deceleration of the vehicle, in the third embodiment of the present invention.

In the third embodiment, when the accelerator pedal 30 is released, the vehicle ECU 22 obtains a total deceleration torque to be generated by the engine 2 and the electric motor 6 to obtain proper deceleration for the vehicle in deceleration as a required deceleration torque according to the revolution speed of the electric motor 6 detected by the revolution speed sensor 36. The vehicle ECU 22 properly divides the required deceleration torque between the engine 2 and the electric motor 6, and indicates to the engine ECU 24 a deceleration torque to be generated by the engine 2 and to the inverter ECU 26 a deceleration torque to be generated by the electric motor 6.

The required deceleration torque is individually set with respect to each gear of the transmission 8 according to the revolution speed of the electric motor 6 as shown by solid lines in an upper graph of FIG. 4. The required deceleration torque is set so as to become larger as the gear becomes higher.

According to the indication from the vehicle ECU 22, the engine ECU 24 brings the engine into the deceleration state and makes the engine 2 generate the deceleration torque by engine braking. According to the indication from the vehicle ECU 22, the inverter ECU 26 controls the inverter 20 and operates the electric motor 6 as a generator, to thereby cause the electric motor 6 to generate the regenerative braking torque.

At this time, an upper limit deceleration torque that is a maximum value of the regenerative braking torque, which can be generated by the electric motor 6 depending on the specification s of the electric motor 6, is set according to the revolution speed of the electric motor 6. The relationships between each required deceleration torque and the upper limit deceleration torque are shown in the upper graph of FIG. 4.

The upper limit deceleration torque is the same as the one used in the first and second embodiments. As shown in FIG. 4, the revolution speed (predetermined revolution speed) of the electric motor 6 at which the required deceleration torque and the upper limit deceleration torque become equal to each other is a revolution speed N1 when the first gear of the transmission 8 is in use, a revolution speed N2 when the second gear is in use, a revolution speed N3 when the third gear is in use, a revolution speed N4 when the fourth gear is in use, and a revolution speed N5 when the fifth gear is in use. Relationship of these revolution speeds is expressed by N1<N2<N3<N4<N5.

The vehicle ECU 22 engages the clutch 4 when the revolution speed of the electric motor 6 detected by the revolution speed sensor 36 is higher than the revolution speed at which the required deceleration torque corresponding to the present gear and the upper limit deceleration torque become equal to each other. Furthermore, the vehicle ECU 22 indicates to the engine ECU 24 the deceleration torque to be generated by the engine 2 and indicates to the inverter ECU 26 the regenerative braking torque to be generated by the electric motor 6 so that the required deceleration torque may be produced by combining the deceleration torque of the engine 2 with the regenerative braking torque of the electric motor 6.

If the revolution speed of the electric motor 6 detected by the revolution speed sensor 36 is equal to or lower than the revolution speed at which the required deceleration torque corresponding to the present gear and the upper limit deceleration torque become equal to each other, the vehicle ECU 22 disengages the clutch 4 and makes the electric motor 6 generate the required deceleration torque only by the regenerative braking of the electric motor 6. By thus controlling the clutch 4 and the electric motor 6, the vehicle ECU 22 converts the deceleration energy into electric power as much as possible and returns the electric power to the battery 18.

When the vehicle is decelerated, the vehicle ECU 22 downshifts the transmission 8 in turn correspondingly to the reduction of the traveling speed according to the predetermined gear shift map for downshift.

When the clutch 4 is engaged, as with the first and second embodiments, the revolution speed of the engine 2 is raised by increasing the fuel supply amount of the engine 2 to avoid a torque shock, to thereby adjust the revolution speed of the engine 2 to correspond to the revolution speed of the electric motor 6.

The relationships between the traveling speed and the revolution speed of the electric motor 6 corresponding to each gear of the transmission 8 are as shown in the lower graph of FIG. 4. The gear shift map used in the third embodiment is the same as the one used in a conventional hybrid electric vehicle as well as the gear shift map used in the first embodiment. In other words, the speed-change lines of the gears and the traveling speeds V1 to V4 at which the downshift during deceleration is performed are the same as those in the first embodiment shown in FIG. 2 and those of the conventional hybrid electric vehicle shown in FIG. 6.

Consequently, in the third embodiment, the transmission 8 is downshifted from the fifth to the fourth gear when the traveling speed detected by the traveling speed sensor 34 decreases to V4, from the fourth to the third gear when the traveling speed decreases to V3, from the third to the second gear when the traveling speed decreases to V2, and from the second to the first gear when the traveling speed decreases to V1.

The lower graph of FIG. 4 shows, by a solid line changes of the revolution speed of the electric motor 6 which are caused by the reduction of the traveling speed and the downshift of the transmission 8 in the case where the accelerator pedal 30 is released, and the vehicle is brought into deceleration with the fifth gear of the transmission 8 selected.

The changes of the revolution speed of the electric motor 6 along each speed-change line, which are caused by the reduction of the traveling speed, and the changes of the revolution speed of the electric motor 6 between two of the speed-change lines at the time of downshift are produced as in the first embodiment.

That is to say, when the traveling speed decreases to V4 due to deceleration of the vehicle, the vehicle ECU 22 downshifts the transmission 8 from the fifth to the fourth gear. As a result, the revolution speed of the electric motor 6 changes while moving from the speed-change line of the fifth gear to that of the fourth gear. The revolution speed of the electric motor 6 at which the required deceleration torque corresponding to the fifth gear that is a gear used before the downshift becomes equal to the upper limit deceleration torque is a revolution speed N5, whereas the revolution speed of the electric motor 6 at which the required deceleration torque corresponding to the fourth gear that is a gear used after the downshift becomes equal to the upper limit deceleration torque is a revolution speed N4. As shown in FIG. 4, the revolution speeds N5 and N4 are different from the revolution speed that falls in the range of revolution speed fluctuation of the electric motor 6 which is induced by the downshift from the fifth to the fourth gear.

When the traveling speed decreases to V3 due to deceleration, the vehicle ECU 22 downshifts the transmission 8 from the fourth to the third gear. As a result, the revolution speed of the electric motor 6 changes while moving from the speed-change line of the fourth gear to that of the third gear. The revolution speed of the electric motor 6 at which the required deceleration torque corresponding to the fourth gear that is a gear used before the downshift becomes equal to the upper limit deceleration torque is a revolution speed N4. The revolution speed of the electric motor 6 at which the required deceleration torque corresponding to the third gear that is a gear used after the downshift becomes equal to the upper limit deceleration torque is a revolution speed N3. The revolution speeds N4 and N3 are different from the revolution speed that falls in the range of revolution speed fluctuation of the electric motor 6 which is induced by the downshift from the fourth to the third gear as shown in FIG. 4.

When the traveling speed further decreases to V2 due to deceleration, the vehicle ECU 22 downshifts the transmission 8 from the third to the second gear. As a result, the revolution speed of the electric motor 6 changes while moving from the speed-change line of the third gear to that of the second gear. The revolution speed of the electric motor 6 at which the required deceleration torque corresponding to the third gear that is a gear used before the downshift becomes equal to the upper limit deceleration torque is a revolution speed N3. The revolution speed of the electric motor 6 at which the required deceleration torque corresponding to the second gear that is a gear used after the downshift becomes equal to the upper limit deceleration torque is a revolution speed N2. The revolution speeds N3 and N2 are different from the revolution speed that falls in the range of revolution speed fluctuation of the electric motor 6 which is induced by the downshift from the third to the second gear as shown in FIG. 4.

When the traveling speed further decreases to V1 due to deceleration, the vehicle ECU 22 downshifts the transmission 8 from the second to the first gear. As a result, the revolution speed of the electric motor 6 changes while moving from the speed-change line of the second gear to that of the first gear. The revolution speed of the electric motor 6 at which the required deceleration torque corresponding to the second gear that is a gear used before the downshift becomes equal to the upper limit deceleration torque is a revolution speed N2. The revolution speed of the electric motor 6 at which the required deceleration torque corresponding to the first gear that is a gear used after the downshift becomes equal to the upper limit deceleration torque is a revolution speed N1. The revolution speeds N2 and N1 are different from the revolution speed that falls in the range of revolution speed fluctuation of the electric motor 6 which is induced by the downshift from the second to the first gear as shown in FIG. 4.

As stated above, in the third embodiment, both the revolution speed at which the required deceleration torque corresponding to the gear used before downshift becomes equal to the upper limit deceleration torque and the revolution speed at which the required deceleration torque corresponding to the gear used after the downshift becomes equal to the upper limit deceleration torque are different from the revolution speed that falls in the range of revolution speed fluctuation of the electric motor 6 when downshift is carried out at each gear. In addition, as shown in FIG. 4, whenever downshift is carried out, the revolution speed of the electric motor 6 does not change through the revolution speed at which the required deceleration torque corresponding to the gear related to the downshift becomes equal to the upper limit deceleration torque.

Consequently, when the vehicle is decelerated, the clutch 4 is switched from the engaged position to the disengaged position only once and only when the revolution speed of the electric motor 6 decreases along speed-change line of the third gear with the reduction of the traveling speed. Therefore, the operation frequency of the clutch 4 at the time of deceleration is reduced, so that it is possible to suppress a decrease in durability of the clutch 4 which is caused by abrasion of the clutch 4, and to prevent a deterioration in drive feeling which is brought about by an increase of vibrations and noises resulting from frequent operations of the clutch 4. It is also possible to improve the fuel economy by decreasing the frequency of adjustment of the engine revolution at the engagement of the clutch 4.

The required deceleration torque used in the third embodiment is individually set with respect to each gear of the transmission 8. As mentioned above, the higher the gear is, the larger the required deceleration torque is set. Accordingly, difference in deceleration torque, which is transmitted to the driving wheels 16 through the transmission 8, between the gears of the transmission 8 can be reduced, and thereby difference in the deceleration, which is obtained in deceleration of the vehicle, between the gears of the transmission 8 can be decreased. As a result, it is possible to moderate a shift shock caused during downshift.

As in the first embodiment, it is not necessary to alter the gear shift map used for downshift of the transmission 8 in the third embodiment in consideration of the relationship between the revolution speed Nx and the revolution speed fluctuation of the electric motor 6 which is caused by downshift. Consequently, the latitude in setting the gear-shift properties with respect to the transmission 8 is increased.

In the third embodiment, the clutch 4 is switched from the engaged position to the disengaged position along with the fluctuation of the revolution speed of the electric motor 6 only once and only when the third gear is in use at the time of deceleration of the vehicle. However, the same effect can be obtained if the clutch 4 is switched from the engaged position to the disengaged position when the selected gear is other than the third by adjusting the required deceleration torque or the gear shift map for downshift.

A fourth embodiment of the present invention will be described below.

A configuration of a substantial part of a hybrid electric vehicle of the fourth embodiment is the same as that of the first embodiment as shown in FIG. 1. The fourth embodiment is virtually identical to the first in terms of the control that is carried out mainly by the vehicle ECU 22 in each traveling state of the vehicle except for the time of deceleration. The fourth embodiment is also the same as the third except for the gear shift map at the time of deceleration. Therefore, the gear shift control that is implemented at the time of deceleration of the vehicle will be described below with reference to FIG. 5.

Figure 5:
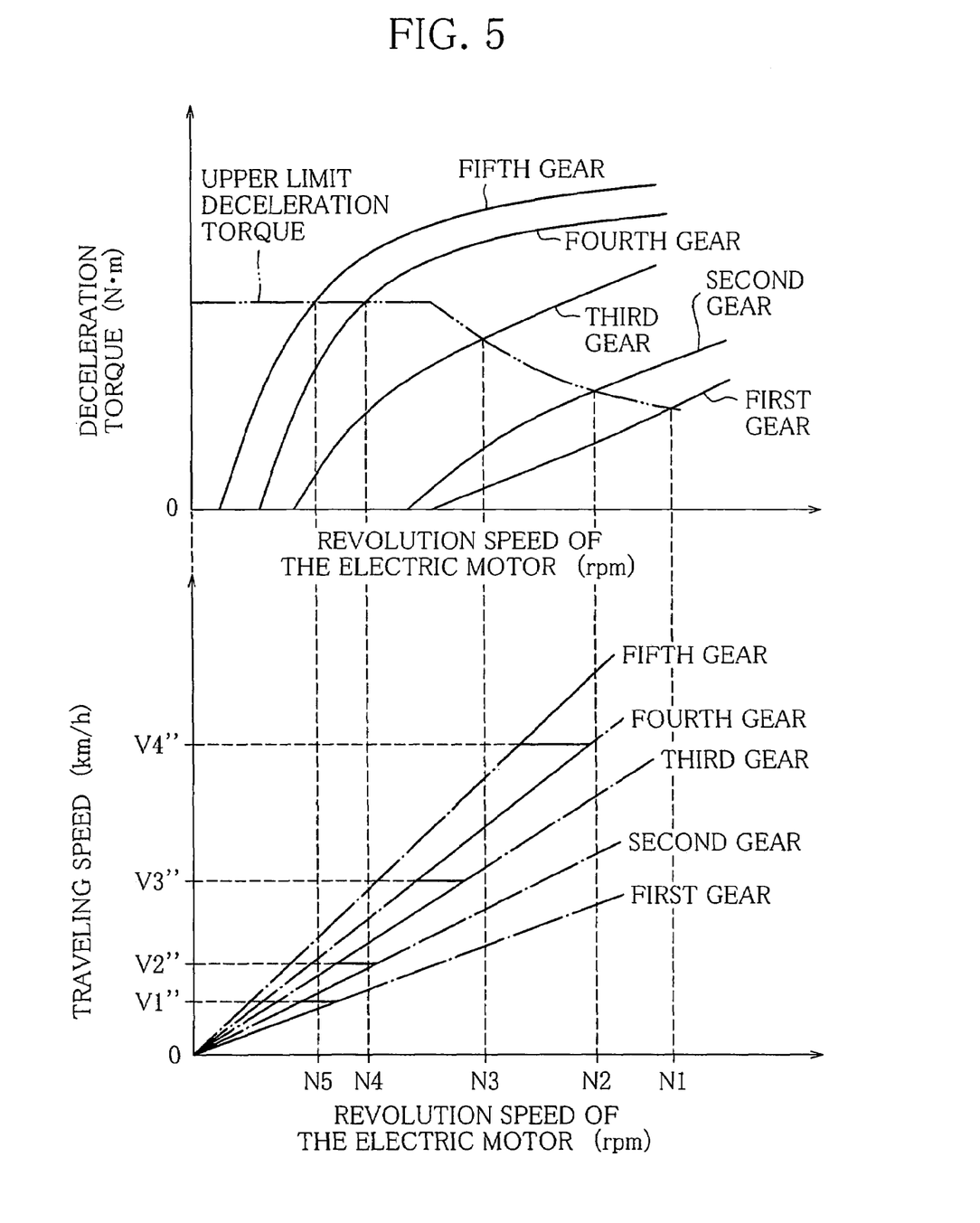
FIG. 5 is a graph showing relationship between the upper limit deceleration torque and the required deceleration torque, and changes of the revolution speed of the electric motor along with the reduction of the traveling speed at the time of deceleration of the vehicle, in the fourth embodiment of the present invention.

As shown in an upper graph of FIG. 5, the upper limit deceleration torque corresponding to the revolution speed of the electric motor 6 and the required deceleration torque corresponding to each gear of the transmission 8 are the same as those in the third embodiment. Accordingly, the revolution speed (predetermined revolution speed) of the electric motor 6 at which the required deceleration torque and the upper limit deceleration torque become equal to each other is a revolution speed N1 when the first gear of the transmission 8 is in use, a revolution speed N2 when the second gear is in use, a revolution speed N3 when the third gear is in use, a revolution speed N4 when the fourth gear is in use, and a revolution speed N5 when the fifth gear is in use. Relationship of these revolution speeds is expressed by N1<N2<N3<N4<N5. A lower graph of FIG. 5 shows changes of the revolution speed of the electric motor 6, which are caused by the reduction of the traveling speed and the downshift of the transmission 8 at the time of deceleration of the vehicle, by a solid line as in FIG. 4 showing the third embodiment. In the fourth embodiment, traveling speeds V1" to V4" at which downshift is carried out are different from the traveling speeds at which downshift is carried out in the third embodiment.

If the traveling speed decreases to V4" while the fifth gear of the transmission 8 is in use, the vehicle ECU 22 downshifts the transmission 8 from the fifth to the fourth gear. As the revolution speed of the electric motor 6 at the time point when the traveling speed decreases to V4" is higher than the revolution speed N5 at which the required deceleration torque corresponding to the fifth gear and the upper limit deceleration torque of the electric motor 6 become equal to each other, required deceleration speed can be produced only by the electric motor 6. In other words, it is not required to engage the clutch 4 to secure necessary deceleration. Therefore, the vehicle ECU 22 keeps the clutch 4 in the disengaged position.

Likewise, after the transmission 8 is downshifted to the fourth gear, the vehicle is decelerated without engaging the clutch 4 until the traveling speed reaches V3". The vehicle ECU 22 downshifts the transmission 8 to the third gear when the traveling speed decreases to reach V3".

When the vehicle ECU 22 downshifts the transmission 8 from the fourth gear (predetermined forward gear) to the third gear, there generates a fluctuation in the revolution speed of the electric motor 6. The revolution speed at which the required deceleration torque and the upper limit deceleration torque become equal to each other varies corresponding to each gear as shown in FIG. 5, and therefore changes due to downshift. For this reason, when the transmission 8 is downshifted from the fourth to the third gear, the magnitude relation between the revolution speed of the electric motor 6 and the revolution speed at which the required deceleration torque and the upper limit deceleration torque become equal to each other, or the revolution speed that requires the disengagement of the clutch 4, is reversed. Stated differently, at the start of the downshift from the fourth to the third gear, the revolution speed of the electric motor 6 is higher than the revolution speed (N4) at which the required deceleration torque corresponding to the fourth gear and the upper limit deceleration torque become equal to each other. On the other hand, at the completion of the downshift from the fourth to the third gear, the revolution speed (N3) at which the required deceleration torque corresponding to the third gear and the upper limit deceleration torque become equal to each other is higher than the revolution speed of the electric motor 6.

Both the revolution speed at which the required deceleration torque and the upper limit deceleration torque become equal to each other and the revolution speed of the electric motor 6 are increased by downshift. However, in the case of the downshift from the fourth to the third gear, the revolution speed at which the required deceleration torque and the upper limit deceleration torque become equal to each other is increased higher than the revolution speed of the electric motor 6. consequently, the vehicle ECU 22 disengages the clutch 4 because the electric motor 6 can generate the required deceleration torque by itself when the fourth gear is in use. On the other hand, the vehicle ECU 22 engages the clutch 4 and makes the engine 2 and the electric motor 6 produce the required deceleration torque by combining the deceleration torque of the engine 2 with that of the electric motor 6 because the required deceleration torque cannot be generated singly by the electric motor 6 when the third gear is in use.

Thereafter, the revolution speed of the electric motor 6 never becomes higher than the revolution speed at which the required deceleration torque and the upper limit deceleration torque become equal to each other until the traveling speed decreases to reach 0 km/h through downshift from the third to the second gear and from the second to the first gear, and the clutch 4 is kept engaged.

Accordingly, in the fourth embodiment, too, it is possible to reduce the frequency of engagement/disengagement of the clutch 4 as in the third embodiment. Such control can be easily actualized simply by changing the traveling speeds V1", V2", V3", or V4" in the gear shift map.

Especially if the vehicle ECU 22 is designed to engage/disengage the clutch 4 when shifting the gears of the transmission 8, the vehicle ECU 22 engages/disengages the clutch 4 for shifting the gears at the time of the downshift from the fourth to the third gear. It is therefore not necessary to separately carry out the engagement/disengagement of the clutch 4 in response to the reverse of the magnitude relation between the required deceleration torque and the upper limit deceleration torque. Consequently, the frequency of engagement/disengagement of the clutch 4 can be further reduced.

The control device for a hybrid electric vehicle according to each embodiment of the present invention has been described above, but the present invention is not limited to the above-mentioned embodiments.

For instance, in the first embodiment, the required deceleration torque is set to a relatively small value without altering the gear shift map of the transmission 8, whereas in the second embodiment, the gear shift map of the transmission 8 is altered without changing the required deceleration torque. It is also possible, however, to combine the foregoing ideas and change both the gear shift map and the required deceleration torque so that the revolution speed at which the required deceleration torque becomes equal to the upper limit deceleration torque differs from the revolution speed that falls in the range of revolution speed fluctuation of the electric motor which is caused by downshift at the time of deceleration of the vehicle.

In the first to third embodiments, the upper limit deceleration torque and the required deceleration torque are set according to the revolution speed of the electric motor 6 detected by the revolution speed sensor 36. However, it is also possible to detect the revolution speed that varies in response to changes of the revolution speed of the electric motor 6, for example, output revolution speed of the transmission 8, instead of the revolution speed of the electric motor 6, and to convert the same to the revolution speed of the electric motor 6.

Although the engine 2 is a diesel engine in the embodiments, the type of the engine is not limited to this, and it may be a gasoline engine, for example.

Although the electric motor 6 is a permanent-magnetic synchronous motor in the embodiments, the type of the electric motor 6 is not limited to this, either. A motor of any type may be used as the electric motor 6 as long as the electric motor is capable of motor and generator operations.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control device for a hybrid electric vehicle capable of transmitting a driving force of an engine and a driving force of an electric motor to driving wheels through an automatic transmission and capable of releasing mechanical connection between the engine and the automatic transmission by using a clutch, comprising:
    revolution speed detection means for detecting revolution speed of the electric motor;
    shift control means that downshifts the automatic transmission according to a reduction of traveling speed of the electric vehicle at the time of deceleration of the electric vehicle; and
    torque control means that sets an upper limit deceleration torque that is a deceleration torque generable by the electric motor and a required deceleration torque that is a deceleration torque to be generated by the engine and the electric motor corresponding to a forward gear presently used in the automatic transmission according to revolution speed detected by the revolution speed detection means at the time of deceleration of the electric vehicle, wherein
    the torque control means disengages the clutch and controls the electric motor so as to generate the required deceleration torque when the upper limit deceleration torque is equal to or larger than the required deceleration torque, and on the other hand, engages the clutch and controls the engine and the electric motor so that a sum of a deceleration torque of the engine and a deceleration torque of the electric motor equals the required deceleration torque when the upper limit deceleration torque is smaller than the required deceleration torque, wherein
    the upper limit deceleration torque is set so as to be equal to the required deceleration torque when the revolution speed of the electric motor is predetermined revolution speed, to be larger than the required deceleration torque in a range where the revolution speed of the electric motor is lower than the predetermined revolution speed, and to be smaller than the required deceleration torque in a range where the revolution speed of the electric motor is higher than the predetermined revolution speed; and
    the predetermined revolution speed for the required deceleration torque corresponding to a forward gear related to downshift of the automatic transmission is different from revolution speed that falls in a range of revolution speed fluctuation of the electric motor at the time of downshift.

2. The control device for a hybrid electric vehicle according to claim 1, wherein
    the required deceleration torque is common to all forward gears of the automatic transmission, and the required deceleration torque is set so that the revolution speed fluctuation of the electric motor caused by any downshift with regard to the forward gears of the automatic transmission is generated in a range lower than the predetermined revolution speed.

3. The control device for a hybrid electric vehicle according to claim 1, wherein
    the required deceleration torque is common to all the forward gears of the automatic transmission; and
    a gear shift map of the automatic transmission is set so that the range of revolution speed fluctuation of the electric motor when downshift is performed with regard to each of the forward gears of the automatic transmission does not include the predetermined revolution speed.

4. The control device for a hybrid electric vehicle according to claim 1, wherein
    the required deceleration torque is individually set with respect to each of the forward gears of the automatic transmission; and
    the predetermined revolution speed for each required deceleration torque that is set correspondingly to the forward gears applied before and after the downshift is different from revolution speed that falls in the range of revolution speed fluctuation of the electric motor at the time of the downshift.

5. The control device for a hybrid electric vehicle according to claim 4, wherein
    the higher the gear is, the larger the required deceleration torque is at least in a part of the range of revolution speed of the electric motor where the required deceleration torque is set.

6. The control device for a hybrid electric vehicle according to claim 1, wherein
    the required deceleration torque is individually set with respect to each of the forward gears of the automatic transmission so that as the forward gears of the automatic transmission are shifted to a lower side, the predetermined revolution speed is increased; and
    a gear shift map of the automatic transmission is set so that when downshift is performed from a predetermined forward gear of the automatic transmission, the downshift is started at revolution speed higher than the predetermined revolution speed for the required deceleration torque corresponding to the predetermined forward gear, and that the predetermined revolution speed for the required deceleration torque corresponding to the gear applied after the downshift is higher than the range of revolution speed fluctuation of the electric motor at the time of the downshift.

* * * * *